United States Patent [19]

Marks

[11] Patent Number: 5,601,334
[45] Date of Patent: Feb. 11, 1997

[54] INTEGRATED CHILD SEAT WITH DETACHABLE BOOSTER SEAT

[75] Inventor: William D. Marks, Plymouth, Mich.

[73] Assignee: Hoover Universal, Inc., Plymouth, Mich.

[21] Appl. No.: 502,069

[22] Filed: Jul. 14, 1995

[51] Int. Cl.⁶ ...................................................... B60N 2/30
[52] U.S. Cl. ........................... 297/238; 297/233; 297/253
[58] Field of Search ....................... 297/236, 237, 297/238, 233, 250.1, 256.16, 256.1, 423.4, 253

[56] References Cited

U.S. PATENT DOCUMENTS

| | | | |
|---|---|---|---|
| 3,380,775 | 4/1968 | Offenbacker | 297/250.1 |
| 4,461,510 | 7/1984 | Cunningham et al. | |
| 4,521,052 | 6/1985 | Cone | 297/250.1 |
| 4,756,573 | 7/1988 | Simin et al. | 297/250.1 |
| 4,943,112 | 7/1990 | Law | 297/238 |
| 5,193,765 | 3/1993 | Simpson et al. | 297/237 |
| 5,224,756 | 7/1993 | Dukatz et al. | |
| 5,328,233 | 7/1994 | Maule | 297/238 |
| 5,472,260 | 12/1995 | Czapski | |

*Primary Examiner*—Peter R. Brown
*Assistant Examiner*—Anthony D. Barfield
*Attorney, Agent, or Firm*—Harness, Dickey & Pierce, P.L.C.

[57] ABSTRACT

An integral child seat having a detachable booster seat in which one panel of a child seat is removable from the child seat and can be placed at another seating position on the seat assembly and attached thereto to provide a raised seating surface for a child who is too large to use the integrated child seat. This eliminates the need to purchase an after market booster seat for use after the integrated child seat has been outgrown. The integrated child seat remains usable by a child with the booster seat is in use at another seating position.

2 Claims, 2 Drawing Sheets

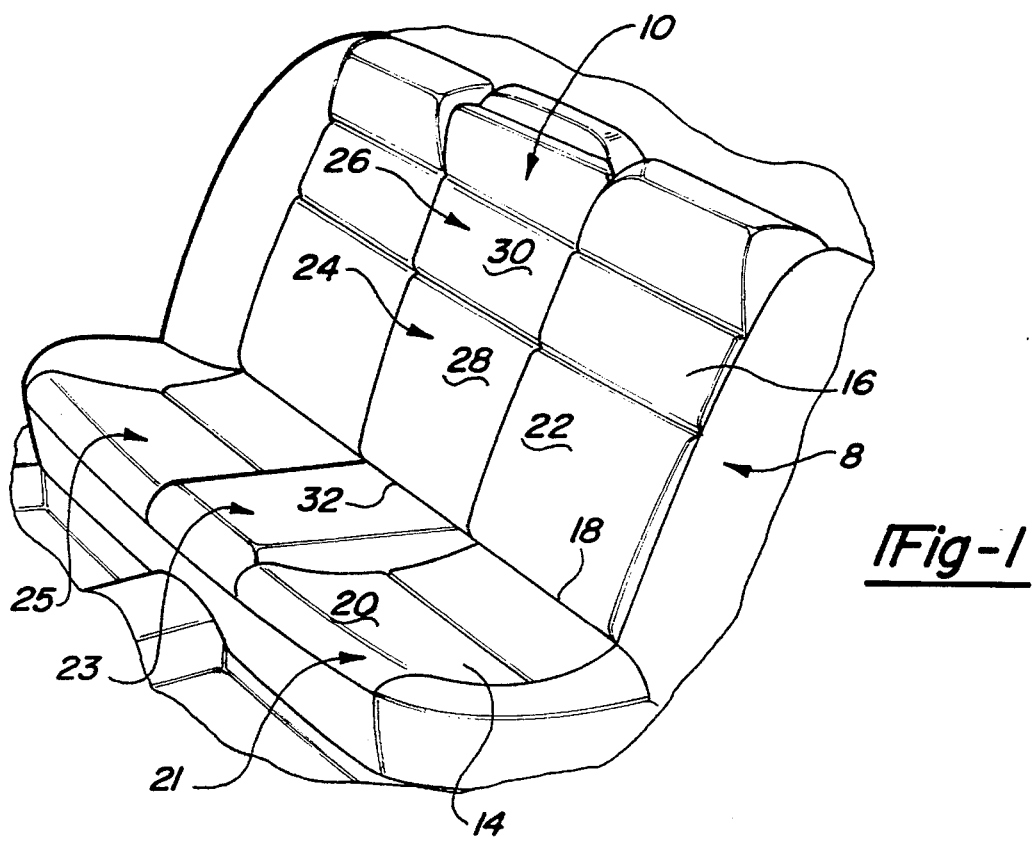
Fig-1
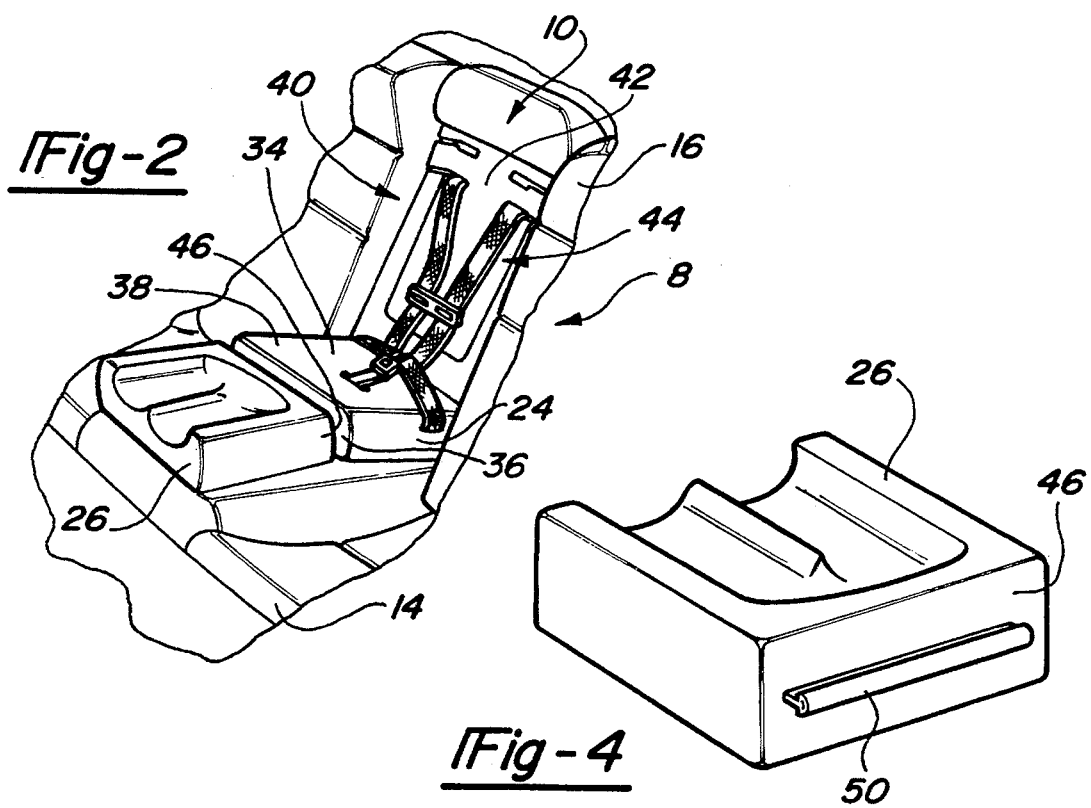
Fig-2
Fig-4

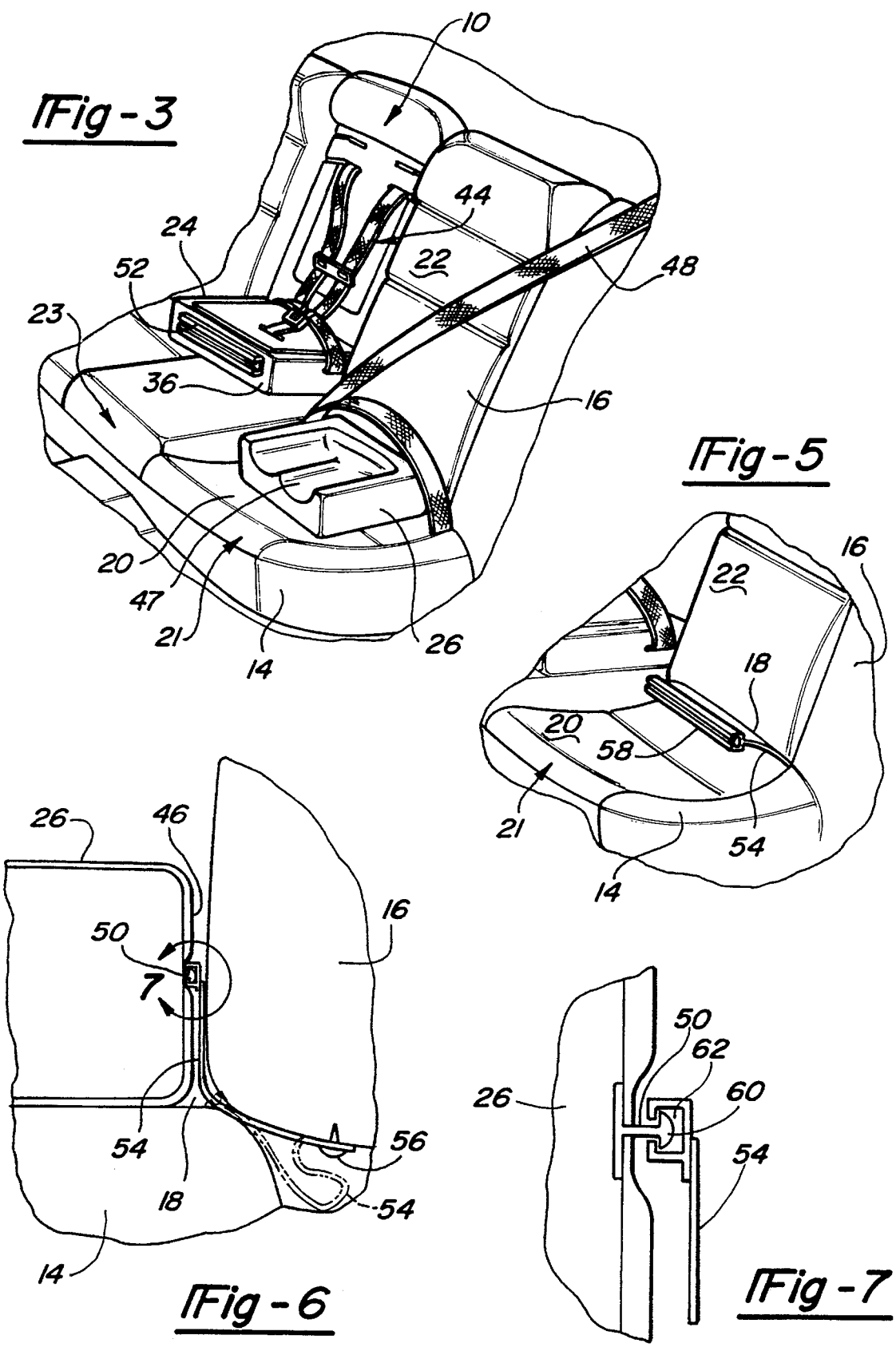

INTEGRATED CHILD SEAT WITH DETACHABLE BOOSTER SEAT

BACKGROUND AND SUMMARY OF THE INVENTION

The present invention relates to a vehicle seat having an integrated child seat and in particular to an integrated child seat with a detachable booster seat for use by a child who is too large for the child seat but not yet large enough for the seat assembly without the use of a raised seat cushion.

Vehicle seats having a child seat contained therein, commonly referred to as an integrated child seat, have been growing in popularity in recent years. An increasing number of vehicles are available with an integrated child seat option. However, an integrated child seat is only useful during a short portion of a child's life. An integrated child seat cannot be used with a newborn infant. Newborn infants require a rearward facing seat to provide the necessary head support. Furthermore, a child will typically outgrow an integrated child seat and its restraint system prior to being large enough to sit in the vehicle seat and be tall enough to use an adult restraint system properly. Accordingly, after market booster seats are available which provide a raised seat cushion for a child, raising the child to a proper height for use of an adult shoulder belt restraint. In addition, the raised height makes it easier for the child to see out of the vehicle and generally results in a more contented child traveler. However, the purchase of an after market booster seat is an added expense to the vehicle owner.

Accordingly, it is an object of the present invention to provide a vehicle seat having both an integrated child seat as well as a booster seat to avoid the need for an after market booster seat.

It is a further object of the present invention to provide an integrated child seat and a booster seat which enables use of the child seat by one child and simultaneous use of the booster seat by a larger child.

The integrated child seat of the present invention includes a pair of panels which are attached to the vehicle seat back and are stowed within a recess in the seat back. When stowed, the panels form a part of the seat back contact surface allowing an adult to use the seat at the location of the child seat. The two panels are attached to one another in an end-to-end relationship with a first panel being rotatably mounted to the seat back at a proximal end adjacent the lower end of the seat back. The second panel is coupled to the distal end of the first panel and is positioned above the first panel when the two panels are stowed in the seat back. In use as a child seat, the first and second panels are rotated forward and downward so as to extend forward from the seat back and overly the seat bottom. The first panel forms a seat cushion for a child occupant while the second panel, which extends forward from the first panel, can be used as a footrest for the child occupant.

The footrest panel is releasably coupled to the seat cushion panel so it can be removed therefrom. When removed, the integrated child seat is still usable, only without a footrest. The footrest panel can be attached to the seat assembly at another seating position and placed upon the adult seat bottom. The panel now serves as a booster seat to raise the child and enable proper use of an adult shoulder belt restraint.

Further objects, features and advantages of the invention will become apparent from a consideration of the following description and the appended claims when taken in connection with the accompanying drawings.

BRIEF DESCRIPTION OF THE DRAWINGS

FIG. 1 is a perspective view of a seat assembly containing an integrated child seat with a detachable booster seat according to the present invention illustrating the child seat panels in their stowed positions;

FIG. 2 is a fragmentary perspective view of the seat assembly of FIG. 1 illustrating the child seat panels in their use positions for use of the seat by a child;

FIG. 3 is a fragmentary perspective view of the seat assembly of FIGS. 1 and 2 showing the child seat cushion panel in its use position with the footrest panel attached to the seat assembly at another seating position for use as a booster seat;

FIG. 4 is a perspective view of the footrest panel;

FIG. 5 is a fragmentary perspective view of the seat assembly illustrating the mating coupler for attaching the footrest panel to the seat assembly;

FIG. 6 is a side elevational view showing the footrest panel attached to the seat assembly for use as a booster seat; and FIG. 7 is an enlarged elevational view of the coupling of the footrest panel to the seat assembly.

DETAILED DESCRIPTION OF THE PREFERRED EMBODIMENT

With reference to FIG. 1, a seat assembly 8 is shown having an integral child seat 10 with a detachable booster seat according to the present invention. The seat assembly 8 includes an adult seat bottom 14 and an adult seat back 16 extending generally upwardly from the rear end of the adult seat bottom 14. The seat bottom 14 and seat back 16 define adult seating surfaces 20, 22 which are engaged by adults seated on the seat assembly 8. The seat bottom 14 and seat back 16 are closely fitted to one another and form a biteline 18 at the lower end of the seat back. The seat assembly 8 defines a left-hand seating position 21, a middle seating position 23 and a right-hand seating position 25. The seating positions are designated for seating of a occupant and are each provided with required restraining systems (not shown).

The integral child seat 10 is contained within the seat back 16 and includes a pair of movable panels 24, 26. The child seat panels 24, 26 are shown in FIG. 1 in stowed positions within a recess 40 (FIG. 2) in the seat back 16. In the stowed positions, the panels 24, 26 have front faces 28, 30 which form a portion of the adult seating surface 22 of the seat back. With the panels in their stowed positions, the middle seating position 23 can be used by an adult.

The seat cushion panel 24 is pivotally attached to the seat back for rotation about a transverse axis adjacent to the lower or proximal end 32 of the seat cushion panel 24. The seat cushion panel 24 is rotatable to a forward extended use position shown in FIG. 2 in which a top face 34 of the seat cushion forms a child seating surface engaged by a child occupant. In its use position, the child seat cushion panel 24 is generally horizontal with its distal end 36 spaced forward from the proximal end 32 and the panel forming a seat cushion for a child.

The second panel 26 extends forward from the child seat panel 24 in its use position, forming a footrest for a child seat occupant. A cover 38 extends over the child seat cushion panel 24 and, if desired, may extend over the footrest panel 26 for protection of the panels. The cover 38 is preferably removable for periodic washing.

When the child seat panels are in their use positions, the recess 40 is revealed in the adult seat back 16. The rear surface 42 of the recess forms a child seat back engaging surface. A child seat restraint system 44 is also stowed in the recess and includes belts attached to the child seat cushion panel 24 and the seat back.

The footrest panel 26 is removably attached at its proximal end 46 to the distal end 36 of the child seat cushion panel 24. In FIG. 3, the footrest cushion 26 has been moved to the left seating position 21 and placed upon the seat bottom 14. The panel 26 is now a booster seat having a top face 47 upon which a child can be seated. The top face is contoured to receive the buttocks and thighs of a child. When seated upon the booster seat, the child is raised to a sufficiently high position to use the shoulder belt 48 provided with the vehicle for use by adults in the left-hand seating position 21.

The coupling of the panel 26 to the child seat cushion panel 24 and to the seat assembly for use as a booster is shown in FIGS. 4-7. A coupler 50 is provided at the proximal end 46 of the child seat panel 26. The coupler 50 is configured to attach to a first mating coupler 52 provided at the distal end 36 of the child seat cushion panel 24. The coupler 50 and first mating coupler 52 are configured to allow repeated attachment and detachment of the footrest panel 26 from the child seat cushion panel 24. The child seat cushion can be used with or without the footrest panel 26 being attached thereto.

With the footrest panel 26 removed from the child seat cushion panel 24, the footrest panel can be attached to the seat assembly 8 at one or the other remaining seating positions 21, 25. A fabric sheet flap 54 is attached to the seat back 16 at its lower end by a fastener 56. The flap 54 carries a second mating coupler 58. The second mating coupler is configured to attach to the coupler 50 of the footrest panel 26. When the footrest panel 26 is not being used as a booster seat, the fabric flap 54 and the second mating coupler 58 are inserted through the biteline 18 and stored beneath the seat back and behind the seat bottom 14 as shown in FIG. 6. The seat bottom 14 and seat back 16 are both made of resilient padding which makes it possible to depress the seat bottom and back to inset the flap 54 and second mating coupler into the biteline.

As shown in the drawings, the coupler 50 is made as an elongated extrusion having a uniform cross-section along its length. Likewise, the first and second mating couplers 52, 58 are also made as elongated extrusions. As shown in FIG. 7, the coupler 50 has a mushroom shaped projection 60 which fits into a C-shaped channel 62 formed by both the first and second mating couplers as shown in FIG. 7. Other coupler configurations may be used as well.

The integrated child seat provides a booster seat for a child who is too large to use the integrated child seat but not yet large enough to use the adult restraint system without being raised in height. There is no longer a need for the vehicle owner to buy a separate booster seat. In addition, with the booster seat in use, the integrated child seat is still usable.

It is to be understood that the invention is not limited to the exact construction illustrated and described above, but that various changes and modifications may be made without departing from the spirit and scope of the invention as defined in the following claims.

I claim:

1. A vehicle seat assembly comprising:

a generally horizontal adult seat bottom;

a generally upright seat back extending upwardly at a rear end of said seat bottom and forming a biteline therebetween, said adult seat bottom and said seat back having a lateral width sufficient to form at least two designated seating positions for two seat occupants to sit side by side in said seat assembly;

a child seat integrated into said seat assembly at one of said designated seating positions, said child seat including a first child seat panel having proximal and distal ends, said first child seat panel being attached to said seat assembly at said proximal end for movement between a stowed position in which said one seating position can be used by an adult and a use position in which said first child seat panel extends generally horizontally and an upper surface thereof forms a seating surface for a child occupant of said child seat, a second child seat panel positioned adjacent said distal end of said first child seat panel and restraint means for use by a child seat occupant positioned upon said first child seat panel;

means for removably attaching said second child seat panel to said first child seat panel including a coupler attached to said second child seat panel and a first mating coupler at the distal end of said first child seat panel; and a second mating coupler adjacent said biteline at another of said designated seating positions for attachment to said coupler whereby said second child seat panel can be removed from said first child seat panel and moved laterally and placed upon said adult seat bottom at said another of said designated seating positions and said coupler attached to said second mating coupler to provide a raised seat for a child seated thereon.

2. The seat assembly of claim 1 wherein said second mating coupler is mounted to a flap of flexible sheet material and is stowed in said biteline of said seat assembly between said adult seat bottom and said seat back, said flap of sheet material being extendable from said biteline for use of said second mating coupler at the rear end of said adult seat bottom for attachment of said second child seat panel thereto for use of said second child seat panel as a raised seat.

* * * * *